United States Patent [19]

Beyers et al.

[11] 4,368,929

[45] Jan. 18, 1983

[54] SEALED TRACK BELT ARRANGEMENT

[75] Inventors: Marvin E. Beyers, Peoria; Anthony E. Kirn, Pekin; Robert W. Untz, Hanna City, all of Ill.

[73] Assignee: Caterpillar Tractor Co., Peoria, Ill.

[21] Appl. No.: 315,772

[22] Filed: Oct. 28, 1981

Related U.S. Application Data

[63] Continuation of Ser. No. 794,167, May 5, 1977, abandoned.

[51] Int. Cl.³ .............................................. B62D 55/24
[52] U.S. Cl. ........................................ 305/11; 305/19; 305/35 R; 305/54
[58] Field of Search .................... 305/11, 13, 19, 35 R, 305/35 EB, 38, 54; 152/175, 176, 187, 188, 199, 198, 185.1

[56] References Cited

U.S. PATENT DOCUMENTS

| | | | |
|---|---|---|---|
| 3,773,394 | 11/1973 | Grawey | 305/19 X |
| 3,802,751 | 4/1974 | Beyers | 305/38 |
| 3,899,220 | 8/1975 | Grawey et al. | 305/54 X |

Primary Examiner—David A. Scherbel
Attorney, Agent, or Firm—Robert A. McFall

[57] ABSTRACT

Spaced elastomer ribs cooperating with the outer cylindrical surface of a flexible track belt within the confines of each track shoe site with a sufficient volume of elastomer in each rib will, when a track shoe is attached to the sites, be deformed to increase the stiffness of the belt in the flexing area between adjacent track shoes and improve the resistance to the ingress of dust and the like between the belt and the underside of each track shoe due to the resiliency of the elastomer in the ribs, allowing them to maintain continuous contact with the underside of the track shoe and the cylindrical belt.

3 Claims, 7 Drawing Figures

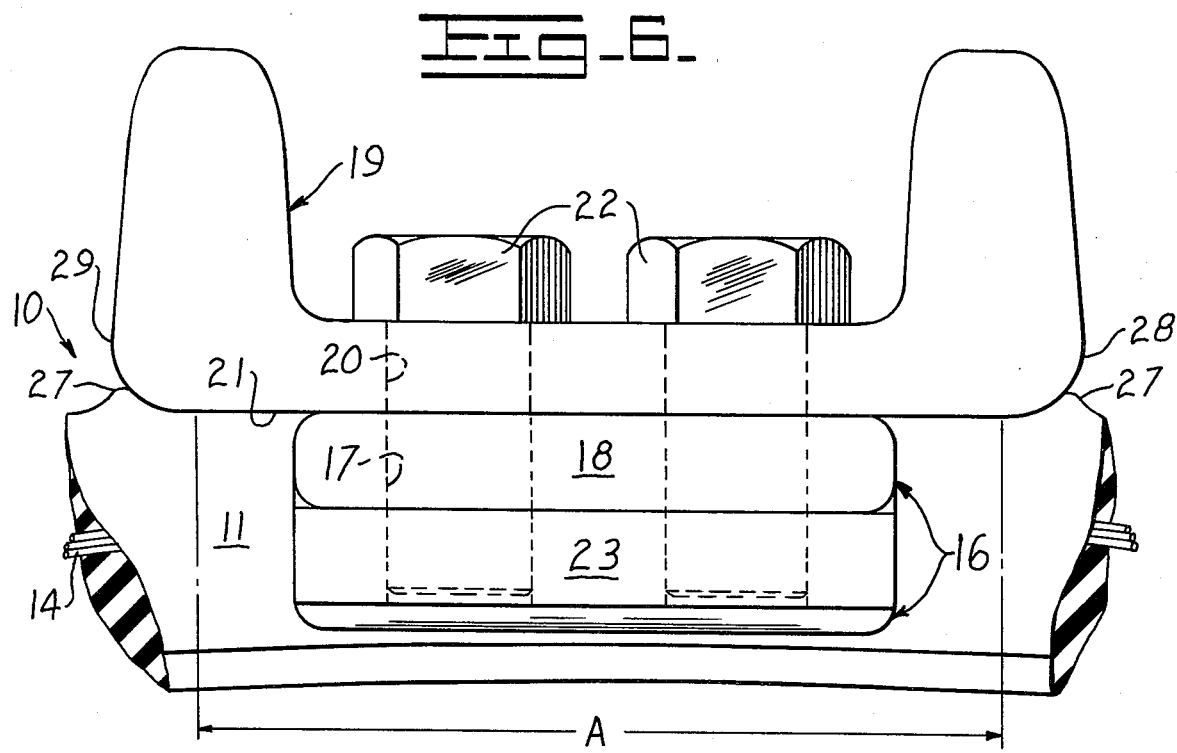
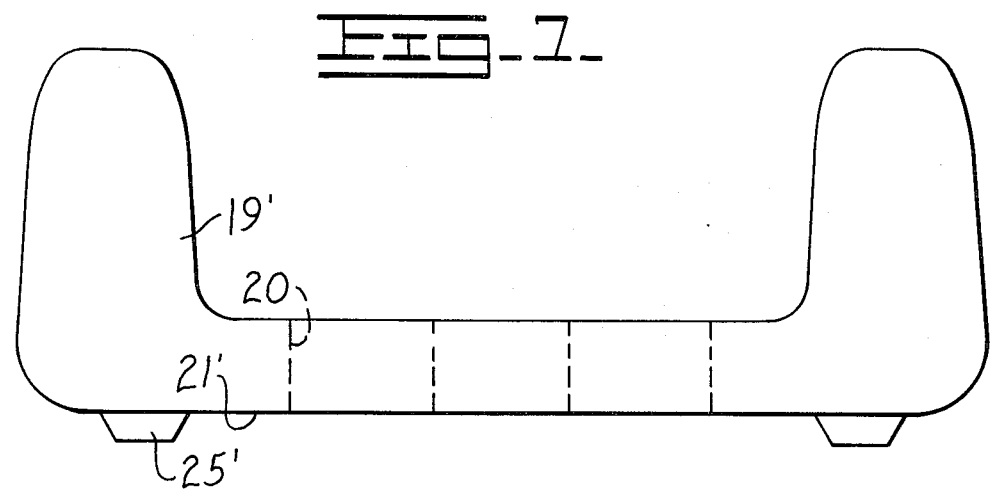

SEALED TRACK BELT ARRANGEMENT

This is a continuation of Ser. No. 794,167, filed May 5, 1977, now abandoned.

BACKGROUND OF THE INVENTION

According to the present invention, in earthmoving operations it is sometimes desirable to increase the traction of rubber-tired work vehicles and/or to increase their resistance to damage due to the environment, such as sharp rocks and the like. To achieve these objectives, flexible belts with track shoes mounted at equally spaced intervals about their outer periphery have been employed over a pneumatic supporting tire carcass. Normally such belts are formed by placing one or more cylindrical reinforcing plies in the central portion of an elastomer cylindrical belt and attaching track shoes thereto by placing a keeper on the inside periphery of the belt for each track shoe on the outer periphery and clamping the belt between the keeper and the underside of its associated track shoe. Reference is made to this assignee's U.S. Pat. No. 3,773,394 issued to Grawey on Nov. 20, 1973 for a more complete description of the flexible track belts described above.

As pointed out in this assignee's U.S. Pat. No. 3,899,220 issued to Grawey et al on Aug. 12, 1975, a particular problem exists relative to the ingress of dirt and other abrasive materials in the area directly under the track shoe, where such materials can cause rapid deterioration of the elastomer portions of the belt and even damage the reinforcing plies, in more severe situations.

This problem occurs because each rectangular shoe's width (as distinguished from its transverse length) is wider than the width of the underlying keeper member associated with it. As a result, the leading and trailing portions of each shoe's undersurface, when the shoe passes into, through and out of the footprint, can separate from the outer circular belt surface, allowing foreign materials to become trapped therebetween. Large sharp rocks are particularly detrimental, as they can penetrate the elastomer surface of the belt to the reinforcing plies, leading to complete belt failure when the reinforcing ply separates.

Normally, the "fit" of the track shoes to the track belt is best in the central or middle portion of the belt where there is the greatest support from the underlying carcass. Thus, the articulation and/or movement of track shoes relative to one another is greatest at the edges of the belt where there is less underlying support. For this reason, the problem is the greatest at the edges and inwardly therefrom for approximately four to six inches.

The sealing ribs between adjacent track shoes disclosed in U.S. Pat. No. 3,899,220 mentioned above, combined with the flat track shoe mounting site vulcanized in the outer cylindrical surface of the belt, are partially effective in reducing this problem, as are the mating ribs and grooves formed with the underside surface of the track shoes and belt surface. However, these features fail to provide increased stiffness in the portions of the belt between adjacent keepers where the flexing of the belt occurs, which leads to the separation of the shoe's surface from the belt surface.

SUMMARY OF THE INVENTION

The present invention is directed to overcome one or more of the problems as set forth above. It involves an improved cylindrical flexible track belt designed to fit circumferentially around a pneumatic tire carcass. The track belt is adapted to receive a plurality of track shoes about its outer periphery on prepared track shoe sites with a keeper member associated with each track shoe site, and preferably includes on its outer surface a pair of cylindrically spaced transverse raised elastomer ribs on each site, which need not be continuous across the central portion of the belt, said ribs located within the track shoe site on opposite sides of the keeper member, each rib being uniform in cross section and of a sufficient height to maintain contact with the underside surface of the track shoe attached to the site at the maximum flexing angle which can occur between adjacent track shoes. As an alternate structure, the ribs could be bonded to the underside of the track shoes mounted on the site so they would be in the same location when the shoes are mounted on the site. In accomplishing this feature, it is to be appreciated that the raised elastomer ribs are distorted when the track shoe is attached to its site and the belt is clamped between it and the keeper member. As elastomer does not compress, it is caused to flow, thereby somewhat enhancing the belt stiffness directly beneath each rib. Resiliency of the rib will cause it to maintain contact with the underside or bottom surface of the track shoe at all times.

BRIEF DESCRIPTION OF THE DRAWINGS

The invention will be better understood by referring to the drawings, wherein:

FIG. 6 is the same view as shown in FIG. 5 with the belt and shoe assembled with one another; and FIG. 7 is an alternate embodiment of the invention wherein each track shoe includes spaced elastomer ribs bonded thereto.

DESCRIPTION OF A PREFERRED EMBODIMENT

Figure 1:
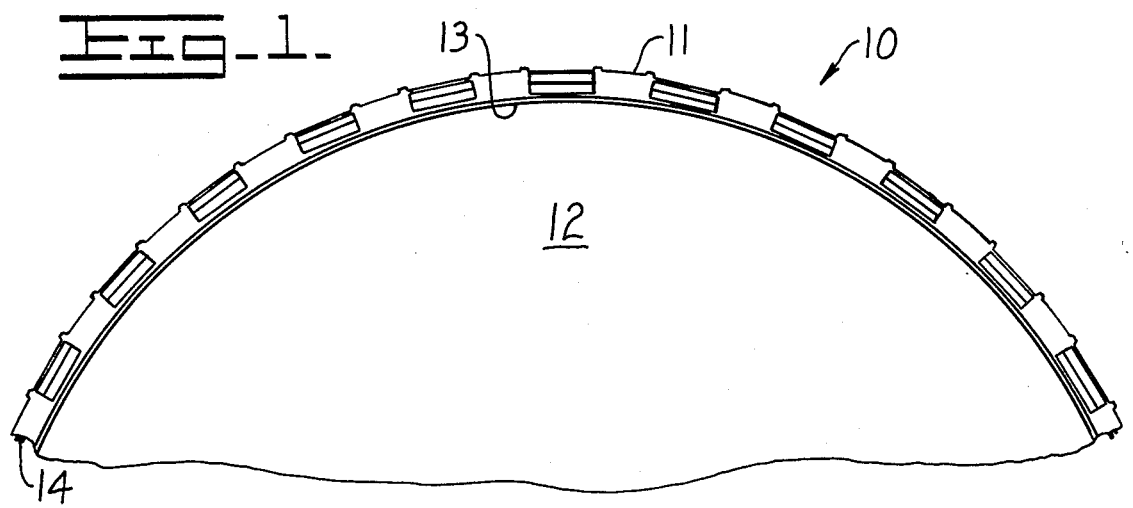
FIG. 1 is an edge elevation of the improved flexible track belt without track shoes mounted thereon and with parts broken away which merely repeat the detail of the parts shown.

An arcuate portion of the improved track belt 10 is shown in FIG. 1 mounted on a pneumatic support carcass 12. A suitable supporting carcass is disclosed and described in U.S. Pat. No. 3,606,921 issued to Grawey on Sept. 21, 1971, and commonly assigned with this application.

Figure 2:
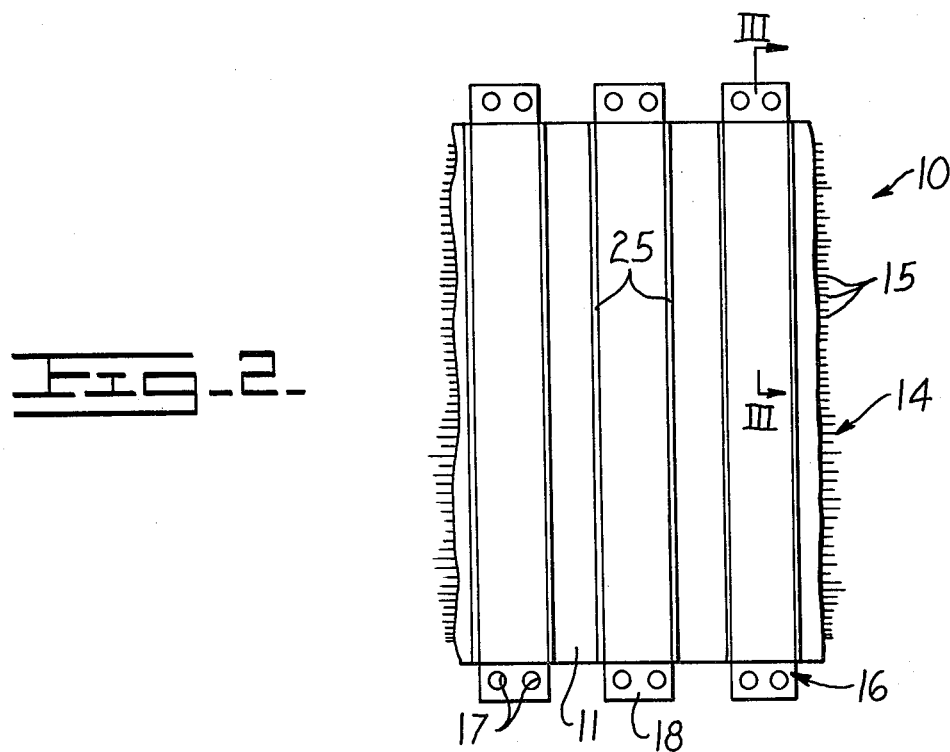
FIG. 2 is a broken-away front view of the circular flexible track belt shown in FIG. 1, also shown without track shoes.

As can be seen in FIGS. 1 and 2, the improved track belt 10 includes an elastomer belt 11 which encircles the outer periphery carcass 12 which has a flat crown portion to receive the inner periphery 13 of the belt. At least one cylindrical reinforcing ply 14 is centrally located within the elastomer belt and is normally composed of a plurality of loops of inextensible reinforcing filaments, such as wire filaments or equivalent synthetic filaments 15, having less than 5% elongation under the working tension to which they are subjected in the belt structure during operation. The elastomer and reinforcing ply are vulcanized as an integral unit.

Figure 3:
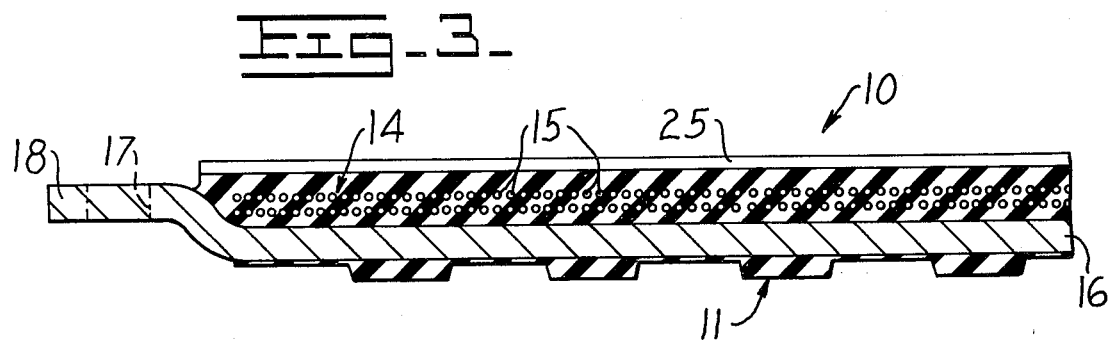
FIG. 3 is a cross section of the flexible track belt along line III—III of FIG. 2.
Figure 4:
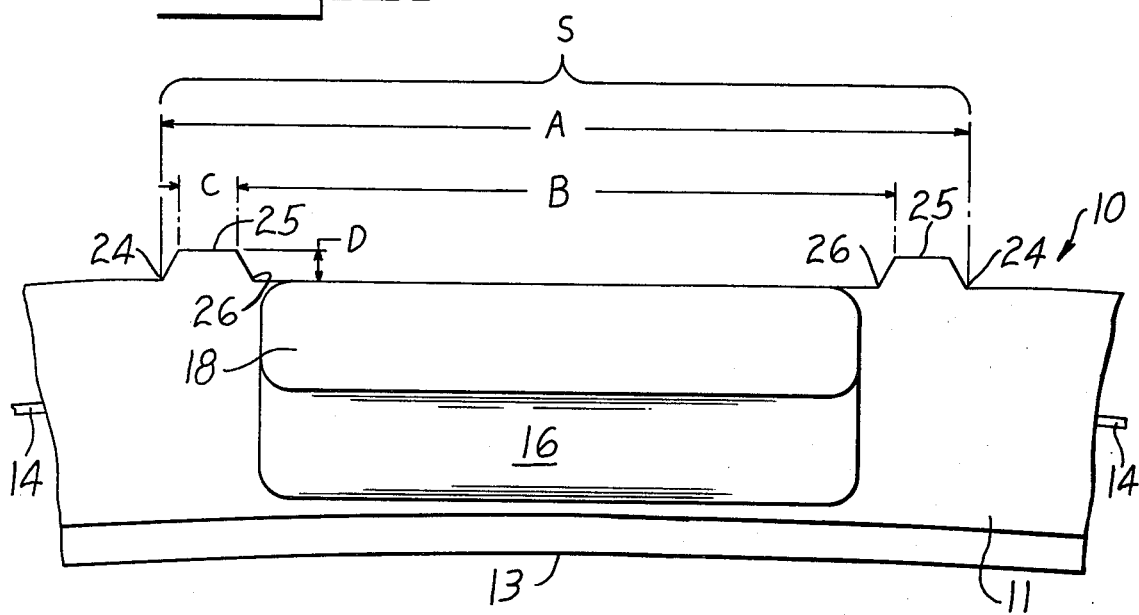
FIG. 4 is an enlarged broken-away portion of the flexible belt shown in FIG. 1.
Figure 5:
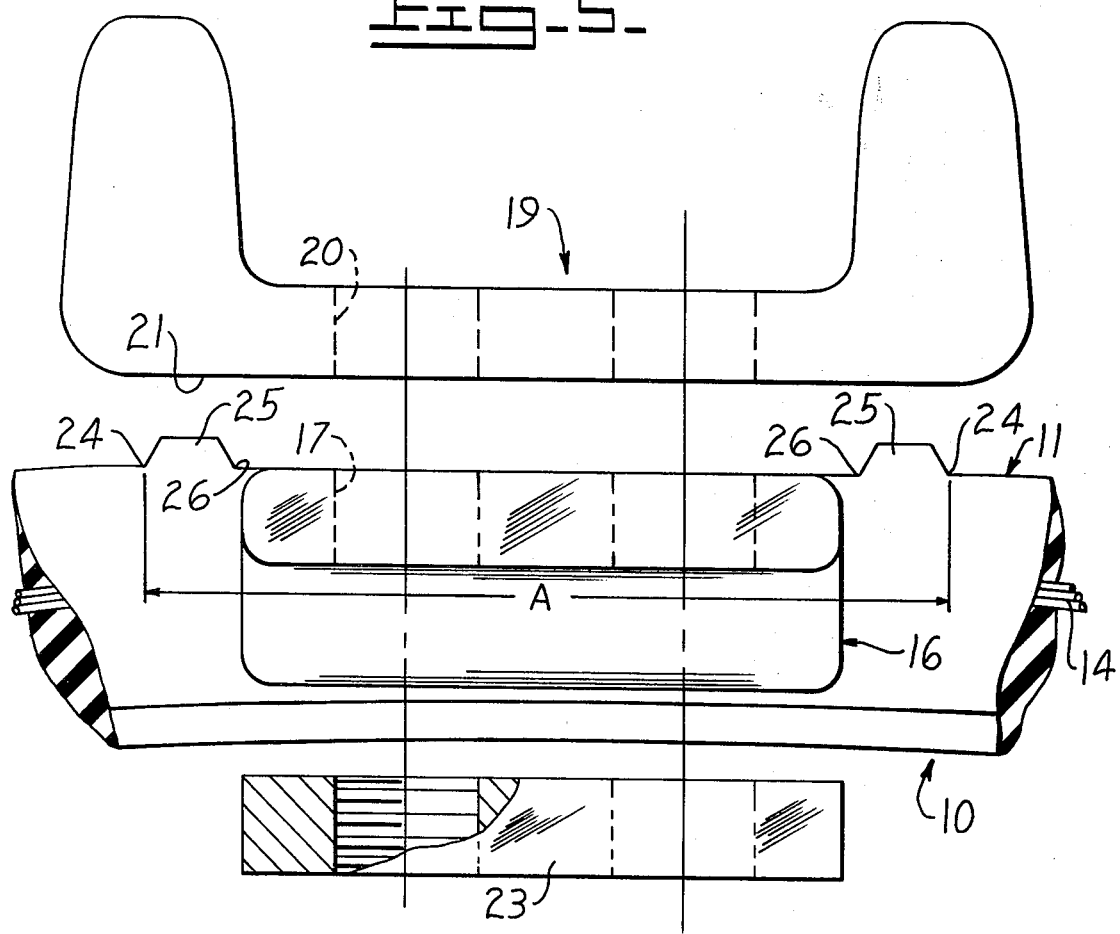
FIG. 5 is an exploded view of a broken-away portion of the track belt shown in FIG. 1 with an associated track shoe for mounting on the track shoe site.

In FIGS. 4 and 5, the detail of each track shoe site S and the associated keeper member 16 can be seen. Each keeper member 16, one shown in cross section in FIG. 3, is usually integrally bonded to the belt on the inner periphery 13 of the belt so its trough-like structure receives a substantial portion of the belt thickness. Holes 17 in the projecting ends 18 of the keeper member are used to attach a track shoe 19 to the site with a bolt passing through mating holes 20 in the extending ends of the track shoe. Tightening the bolts pulls the bottom surface 21 of the track shoe into its associated site and clamps the belt between the keeper member and the track shoe as shown in FIG. 6. Bolts 22 extend through holes 20 and 17 and into a threaded retaining block 23 to attach the shoe to its site S.

More particularly, the details of each site S can best be appreciated by referring to FIGS. 2, 4 and 5. In FIG. 4, the site is defined as the circumferential outer surface portion of the flexible belt between the outer edges 24 of ribs 25 having a keeper member 16 located between the inner edges 26. As can be seen, these ribs 25 run transversely across the belt parallel with the longitudinal axis of their adjacent keeper member and have a uniform cross section. Further, they do not overlap the keeper member, which has a width less than the width of the rectangular track shoe 19. While the ribs 25 are shown as extending completely across the surface of the track belt, it should be appreciated that these ribs need not be continuous in the central portion of the belt where the underlying carcass supports the inner periphery of the belt more fully, allowing very little articulation and movement between the shoes and the belt. However, each rib, to be effective, must extend inwardly at least six inches from each edge of the belt. Thus, the terminology of spaced-apart parallel ribs does not require that the ribs 25 be continuous, and it can be appreciated that they can be formed of several segments.

In a belt for a 76 inch tire, the track shoe site accepting a track shoe 19 having a width of 6.50 inches would be a distance A, which is approximately five inches wide measured between edges 24. The distance B between the top inner edges of the ribs 25 would be approximately four inches and the width C across the top of each rib would be 0.375 inches. In this size belt, the height D of the rib above the arcuate surface of the belt is approximately 0.20 inches, and the shoe 19 would extend beyond the site by 0.75 inches on both sides.

The height of the ribs can vary between 0.05 inches to 0.50 inches, while the average width can vary from 0.10 inches to 0.75 inches. These parameters define a volume of an elastomer ribbon on the surface belt which will be deformed when the shoe is clamped thereon and result in some elastomer "flow". Looking at FIG. 6, it can be appreciated that volume should be sufficient for this flow to cause a slightly raised rib 27 to develop contiguous to the leading and trailing edges of the track shoe 19. When rib 27 develops, the volume of elastomer will be sufficient to increase the "stiffness" of the belt directly beneath the leading and trailing edges, 28 and 29 respectively, of the track shoe. In reference to the shape of the rib 25, it should be appreciated that the preferred shape is shown in the drawings. It should also be appreciated that it could have a more irregular shape, so long as the necessary volume of elastomer is present in the critical area defined as being from the edges of the belt and inwardly at least six inches. The necessary volume can be defined as a regularly shaped rib having the parameters defined above.

As can be seen, the bottom surface 21 of each track shoe 19 is substantially flat, and it is desirable to round the leading and trailing edges of the shoe. A half-inch radius is often satisfactory, and will reduce wear between the belt and the shoe in the vicinity of rib 27 when it is formed. It is preferred that radii on the leading and trailing edges of the track shoes be from 0.12 inches to 1.5 inches, since when held to within these limits, the erosion of the belt immediately adjacent and contiguous thereto can be sharply reduced, sometimes as much as 50%.

Also, it should be appreciated that the formation of the rib 27 occurs only when the belt is supported by a pneumatic carcass that prevents the belt from varying from a cylindrical configuration when the ribs 25 are deformed.

During operations, the resilient ribs 25 will maintain contact with the bottom surface of the shoe, sealing out dirt and the like which would otherwise decrease the belt's service life. Further, the increased belt "stiffness" will also lessen the relative movements between the shoe and its associated site.

An alternate embodiment is shown in FIG. 7 wherein elastomer ribs 25' are bonded directly to the flat bottom surface 21' of a track shoe 19'. It should be appreciated that these ribs are constructed to the same shape, size and configuration as described above for those incorporated in the track belt 10. Also, the track shoe 19' has its leading and trailing edges rounded to the preferred radii described above.

As a result, when such ribs 25' are bonded directly to each track shoe and spaced in the same manner as those described for the ribs 25 incorporated in the belt, a similar elastomer "flow" will occur in a belt without elastomer ribs incorporated in its individual track shoe sites S when each track shoe 19' is mounted by clamping the belt between the bottom surface 21' of the track shoe 19' and the associated keeper member 16. Thus, a similar sealing rib 27 will form at the leading and trailing edges of the shoe 19' when it is attached as described above. Obviously the ribs 25' will maintain a seal between the bottom of the shoe and the contiguous area of the belt, due to their resiliency.

It may be possible to adopt other "shapes" for the elastomer ribs 25 and 25' that will develop the necessary elastomer "flow" to cause the raised protrusions 27 at the leading and trailing edges of the track shoe. When such protrusions form, the belt is stiffened directly beneath these protrusions, allowing less articulation between the bottom of each shoe and the belt surface on which it is mounted when the shoe passes through the footprint. Obviously this lessens the ingress of foreign material between the shoe and the belt, leading to improved service life.

The embodiments of the invention in which an exclusive property or privilege is claimed are defined as follows:

1. In a flexible track belt (10) adapted to be positioned circumferentially about a pneumatic tire carcass (12), said flexible track belt (10) having an elastomeric belt (11), a plurality of track shoes (19), and a plurality of means for attaching each of said track shoes (19) at a respective preselected shoe site (S) to said elastomeric belt (11), said attaching means including a keeper member (16) positioned at each shoe site (S), said elastomeric belt (11) having a spaced pair of raised elastomer transversely extending ribs (25) positioned within each of said shoe sites (S) on opposed sides of said keeper member (16), the improvement comprising:

said elastomeric belt (11) having first and second planar surfaces positioned immediately adjacent each of said shoe sites (S) and extending transverse said elastomeric belt (11) and along a respective rib (25), each of said ribs (25) being completely covered by a shoe (19) and each of said planar surfaces extending outwardly from a respective shoe (19) in the attached position of the shoe (19) at said site (S), said shoes (19) having a generally planar surface in contact with the elastomeric belt (11) in the installed position of the shoes (19) on the elastomeric belt (11), and said ribs (25) being of a construction sufficient to be maintained in forcible contact with the shoe (19) over the entire length of the rib (25) during flexing of the elastomeric belt (11) and to generate a raised rib of elastomer contiguous to the leading and trailing edges of said shoe in the planar surfaces of the belt (11) in response to connecting the track shoe (19) to the keeper member (16).

2. The flexible track belt (10), as set forth in claim 1, wherein said transversely extending ribs (25) have a height of from about 0.05 in. (1.3 mm) to about 0.50 in. (12.7 mm) and a width from about 1.0 in. (2.5 mm) to about 0.75 in. (19.0 mm).

3. The flexible track belt (10), as set forth in claim 1, wherein said track shoes (19) have a longitudinal axis and said generally planar surface of said shoes (19) terminates in a rounded leading edge (28) and a rounded trailing edge (29), said leading edge (28) and said trailing edge (29) being parallel with said longitudinal axis of said shoe and each of said rounded edges (28,29) having a radius of from about 0.12 in (3.0 mm) to about 1.5 in (38.1 mm).

* * * * *